Sept. 14, 1965 J. W. OGLAND 3,206,548
COMMUNICATIONS APPARATUS
Filed Dec. 18, 1961 3 Sheets-Sheet 2

Sept. 14, 1965  J. W. OGLAND  3,206,548
COMMUNICATIONS APPARATUS
Filed Dec. 18, 1961  3 Sheets-Sheet 3

United States Patent Office 3,206,548
Patented Sept. 14, 1965

3,206,548
COMMUNICATIONS APPARATUS
Jon W. Ogland, Glen Burnie, Md., assignor to Westinghouse Electric Corporation, East Pittsburgh, Pa., a corporation of Pennsylvania
Filed Dec. 18, 1961, Ser. No. 159,880
11 Claims. (Cl. 178—7.88)

This invention relates to communications apparatus and more particularly relates to a means for beaming non-coherent optical radiation.

The efficiency of communications by means of electromagnetic radiation depends upon the degree of beaming of the radiated power in the desired direction. To attain extreme ranges, beam widths of only a fraction of a degree wide are necessary. In order to produce such beams with non-coherent radiation such as ultraviolet, visual and infrared radiation, it is necessary that the emitter be as nearly as possible to a point source in order to obtain the highest possible power density. One of the most important limitations to power density, however, is the temperature rise in the emitting spot, caused by the losses inherent in the conversion from electrical to radiant energy. The most satisfactory method for producing such high intensity point sources is excitation of a suitable phosphor with a high voltage electron beam. Instantaneous power densities several times higher than that on the surface of the sun are thereby possible. Relative movement between the point source and the phosphor is necessary, however, in order to prevent it from burning through the phosphor as well as the substrate and tube envelope. Two methods of solving these problems are described in U.S. Patent Office application Serial No. 159,246, filed December 14, 1961, and U.S. Patent Office application Serial No. 159,881, filed December 18, 1961, both of which are assigned to the assignee of the present invention. The former uses a stationary electron beam and a rotating phosphor screen to provide the needed heat transfer while the latter uses a rotating cathode ray tube in conjunction with a stationary deflection yoke.

Furthermore, to preserve efficiency and modulation linearity the temperature limit has to be set lower than the phosphor burning point. Practically all cathode ray tubes use a glass face plate on which the phosphor is deposited. For ordinary applications, such face plates are convenient and satisfactory. For applications in which a high density power source is needed however, the heat conduction of glass in some instances is not as good as desired.

An object of the present invention, therefore, is to provide a new and novel means for obtaining an optical radiation source.

Another object of the present invention is to provide a narrow beam of non-coherent radiation in the optical region of the electromagnetic spectrum.

Still another object of the present invention is to provide a means of generating a stationary light beam having a narrow beamwidth from a high intensity point source.

And yet another object of the present invention is to provide means for better heat conduction in an optical generator requiring a light source of the highest possible power density.

Other objects and advantages will become apparent after a study of the following specification when read in connection with the accompanying drawings, in which.

The present invention utilizes a cathode ray tube to generate a high intensity spot of light which acts as the light energy source. Furthermore optical means forming a beaming device are provided to form a virtual image of the spot and the light radiated by the optics appears to be emitted from the virtual image rather than the spot itself. This is accomplished by locating the focal point of the beaming device at the point where the virtual image appears. Relative movement between the spot and the fluorescent screen is provided to dissipate the heat produced but the light beam is made to appear to emanate from a stationary source.

Figure 1:
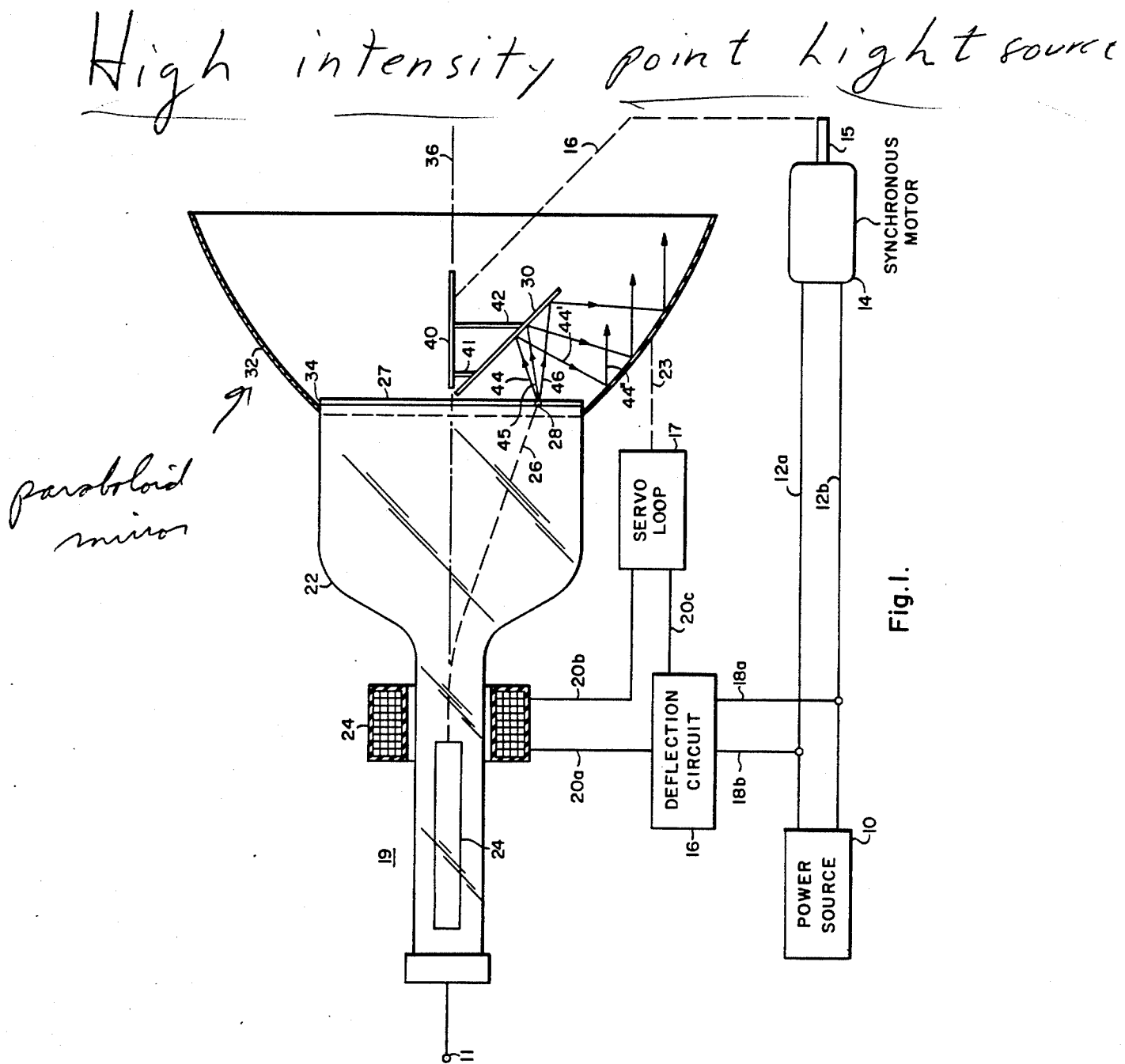
FIGURE 1 is an illustrative diagram of a preferred embodiment of the present invention.
Figure 2:
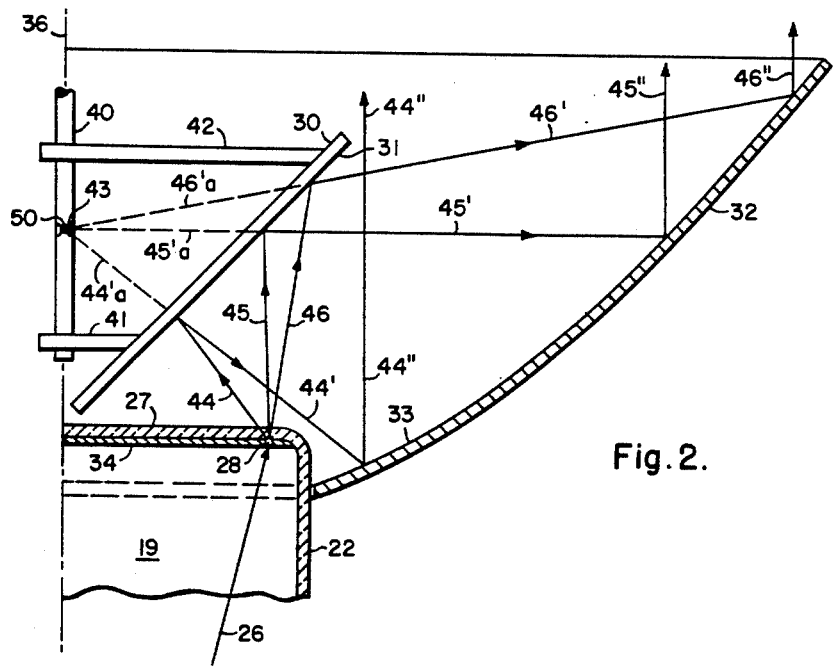
FIG. 2 is a diagram more fully explaining the preferred embodiment shown in FIG. 1.

In the preferred embodiment as shown in FIGS. 1 and 2, a virtual image is obtained by means of a plane mirror mounted at an angle of 45° with the tube axis or by means of a prism mounted in place of the mirror. The virtual image of the emitting spot lies on the tube axis at a distance from the screen equal to the radius of the spot from the center of the screen. Since radiation appears to emanate from the virtual image, the use of a paraboloid mirror with its focal point coincident with the virtual image will cause all rays to be reflected in a beam centered around the common axis of the cathode ray tube and the paraboloid. The only spreading of the beam is due to the finite size of the excited spot or source of light energy and its virtual image. The beam width of the deflected beam is equal to the ratio of the spot diameter and the focal length of the paraboloid. Therefore, it is necessary that the spot size be as nearly as possible to a point source.

Figure 3:
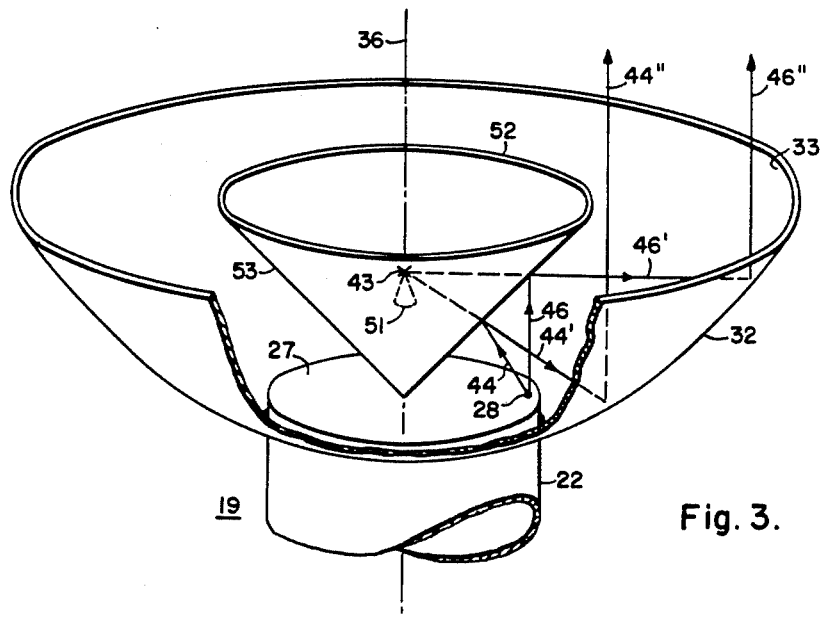
FIG. 3 is an illustrative diagram of another embodiment of the present invention.

In the embodiments shown in FIGS. 1–4, the excited spot forming the point source of light radiation is swept around the fluorescent screen in a circular on a spiral trace and the 45° mirror is rotated in synchronism with said spot or the mirror is replaced by a reflective cone as shown in FIG. 3. In FIG. 5 a virtual image of the spot formed on the cathode ray tube is produced but both the virtual image and the spot in this instance remains relatively stationary. However, the cathode ray tube is spun around on its axis and backward radiation is utilized to transfer the light to the optical beaming device. Also the embodiments of FIGS. 4 and 5 utilize a metal substrate beneath the phosphor in order that the heat produced may be more readily transferred.

FIG. 1 illustrates the preferred embodiment of the present invention. A cathode ray tube 19 having an electron gun 24 mounted inside of the glass envelope 22 has an input means 11 for applying an input signal which can intensity modulate the electron beam 26 generated by the electron gun 24. A fluorescent screen 34 comprising a short persistence phosphor is deposited on the face 27 of the cathode ray tube 19 and the electron beam 26 is focused to produce a spot of light 28 on the fluorescent screen 34. A rotatable flat plane mirror 30 is placed in front of the cathode ray tube 19 tilted at an angle with respect to the face 27. The flat mirror 30 moreover, is connected to a spindle 40 by means of members 41 and 42. The spindle 40 is located along the axis 36 of the cathode ray tube 19 so that the mirror 30 may be rotated about the face 27 in order to scan the entire circular area bounded by the face of the cathode ray tube 19. A paraboloid mirror 32 is disposed around the outside of the glass envelope 22 such that it receives light beams which are reflected from the flat mirror 30 and beams of these light rays to an external point.

FIG. 2 more fully illustrates the manner in which this is accomplished. The flat or plane mirror 30 is shown disposed at an angle of 45° with respect to the axis of rotation 36 which axis is also the central axis of cathode ray tube 19. The electron beam 26 is shown striking the fluorescent screen 34 to produce a source of light 28 with rays 44, 45 and 46 emanating therefrom. These rays are reflected from the face 31 of mirror 30 and constitute rays 44', 45' and 46'. A virtual image 50 of the spot 28 is formed behind the mirror 30 along the rotational axis 36 being at the intersection of the virtual rays 44'A, 45'A and 46'A. The paraboloid mirror 32 reflects rays 44', 45' and 46' from the inner face 33 and are radiated as rays 44'', 45'' and 46''. The focal point 43 of the paraboloid mirror 32 is designated as an X. It is made to lie on the axis of the tube 36 and is coincident with the virtual image 50.

Referring back to FIG. 1, deflection means 24 as shown in FIG. 1, constituting a magnetic deflection yoke, is located around the neck of the cathode ray tube 19 forward of the electron gun 24 for providing deflection of the spot 28. The movement around the surface of the fluorescent screen 34 is in the form of a circular or spiral trace with the axis 36 being the center thereof. The rotatable plane mirror 30 is made to rotate about axis 36 in synchronism with the movement of the spot 28 in order to constantly reflect light emanating from the spot. This synchronization is provided for in the preferred embodiment by means of a synchronous motor 14 being driven from the same power source 10 which in turn drives the deflection circuit 16. This is accomplished by connecting the input leads 18A and 18B to the deflection circuit 16 across the input leads 12A and 12B leading to the synchronous motor 14. By proper phasing, the deflection circuit 16 can deflect the spot 28 so that it continuously radiates into the plane mirror 30 which is rotating due to the mechanical connection 16 from the rotor hub 15 of the synchronous motor 14. Also a servo loop 17 shown in block diagrammatic is connected to the paraboloid mirror 32 by means of a mechanical linkage 23 for moving mirror 32 axially with respect to the axis 36 of the cathode ray tube 19 in order to maintain the coincidence of focal point 43 with the virtual image 50 in FIG. 2. Depending on the diameter of the trace formed by the spot 28 or the movement in the form of a spiral the paraboloid is moved accordingly. The servo loop 17 moreover is controlled by the current flow from the deflection yoke 24 by means of leads 20b and 20c in and out of the servo loop, respectively.

At any one instant only part of the paraboloid 32 is utilized. At first blush, it might be thought that wobbling of the beam would take place at the rate of rotation of mirror 30 and that the rate of rotation therefore would have to be higher than the highest modulation frequency of the communication which is transmitted by intensity modulating the electron beam 26 in accordance with an input signal applied to the input means 11. This would present a restriction for very short range communication only; however it would not be objectionable for long range communications for which this apparatus is intended. Other considerations make narrow beamwidth and narrow modulation band width mandatory for extreme ranges. However, at such ranges even a beam of a fraction of a degree covers a large area whose diameter is many times larger than the diameter of the paraboloid. The "twilight zone" which is fluctuating due to mirror rotation of the plane mirror 30 is infinitesimally small compared to the irradiated area in space. At ranges larger than a certain minimum, the modulation frequency of the input signal may be chosen independently of mirror speed. The mirror speed is determined only by the heat transfer in the phosphor screen and mechanical feasibility. Measurements have indicated that instantaneous power density in the phosphor of the fluorescent screen can be as high as three times that of the surface of the sun without burning at a beam deflection speed of only 60 r.p.s. These measurements, moreover, were made on a commercially available cathode ray tube. In specially designed tubes, such as utilized in FIGS. 4 and 5, even higher power densities are feasible, in a rotation speed of 60 r.p.s. presents no mechanical problems with the size of mirror which the preferred embodiment requires. In addition, mirror 30 should be large enough to capture the major part of the radiation from the sweeping spot 28. Although the synchronism between the spot 28 and the mirror movement is obtained by driving a synchronous motor 14 and the deflection yoke 24 including the deflection circuit 16 from the same power source 10, it is shown for purposes of illustration only and is not meant to be read in a limiting sense. For example, an extra stator winding could be included on the motor 14 to deliver drive power for the yoke 24.

In instances where better phosphor utilization is required the electron beam 26 is deflected in a spiral trace and the virtual image 50 formed behind the rotating mirror 30 will remain on the center line 36 but will slowly move up and down, that is, it will move in and out with reference to the tube face 27 and consequently, out of the focal point 43 of the paraboloid mirror 32. Defocusing is eliminated by means of a servo loop 17 providing axially reciprocating movement of the paraboloid 32 along the axis 36 of the cathode ray tube 19. The distance of the virtual image from the screen 34 is equal to the radius of the spiral which is proportional to the current in the deflection yoke. This current provides a suitable control current for the servo loop 17. Again, this is meant to be described for purposes of illustration only and is not meant to be considered in limiting sense.

In summation, the preferred embodiment provides a means for establishing a stationary virtual image of a moving point source and by placing this virtual image rather than the emitting spot in the focal point of the beaming mirror or lens, a light beam is created from an apparent stationary source. This arrangement moreover collects the emitted radiation as efficiently as if a stationary point source were available.

The 45° synchronously rotating mirror 30 may be replaced by a stationary conical mirror 52, as shown in FIG. 3 thereby providing another embodiment of the present invention. Referring to FIG. 2, the cathode ray tube 19, as illustrated in the preferred embodiment of FIG. 1 is utilized to generate a spot of light 28 approaching a point source. The spot 28 is provided with angular rotation about the tube face 27. Light rays shown as rays 44 and 46 emanate from spot 28 and are reflected from the conical mirror 52 as rays 44' and 46'. A virtual image 51 of the spot 28 is formed inside of the cone near the center line 36 being the axis of the tube which likewise passes through the apex of the cone. It will be found that an excited point 28 on the phosphor is imaged as a small bright cone 51 with the apex in the original spot image which is shown in FIG. 2 as being at the focal point 43 of the paraboloid mirror 32. This exists because any emitted ray lying in an axial plane will be reflected from the conical mirror 52 as if it originated in a virtual spot image on the center line 36. Emitted rays, however, which emanate at an angle with such a plane will, however, be reflected laterally more than they would from a plane mirror due to the curvature provided by the conical surface and consequently appear to originate in a point off the center line 36. The location of this point may be determined by assuming a reflecting plane tangential to the conical surface of mirror 52 in the point of incidence of each particular ray. The cone 51 flares out toward the phosphor screen 34 with brightness descreasing with increasing distance from the apex. Where extreme ranges are not required, the virtual image thus deformed provides sufficient beam concentration. The beam width formed by the paraboloid mirror 32 is given by the diameter of the virtual image divided by the focal length of the paraboloid mirror 32. The radiated beam from the paraboloid 32 appears as 44' and 46′. Means may also be provided as shown in FIG. 1 for moving the focal point 43 in accordance with the trace described by the spot 28. When providing sufficiently narrow beam for the required communication this embodiment has the advantage of operating with relatively little or any moving parts.

Figure 4:
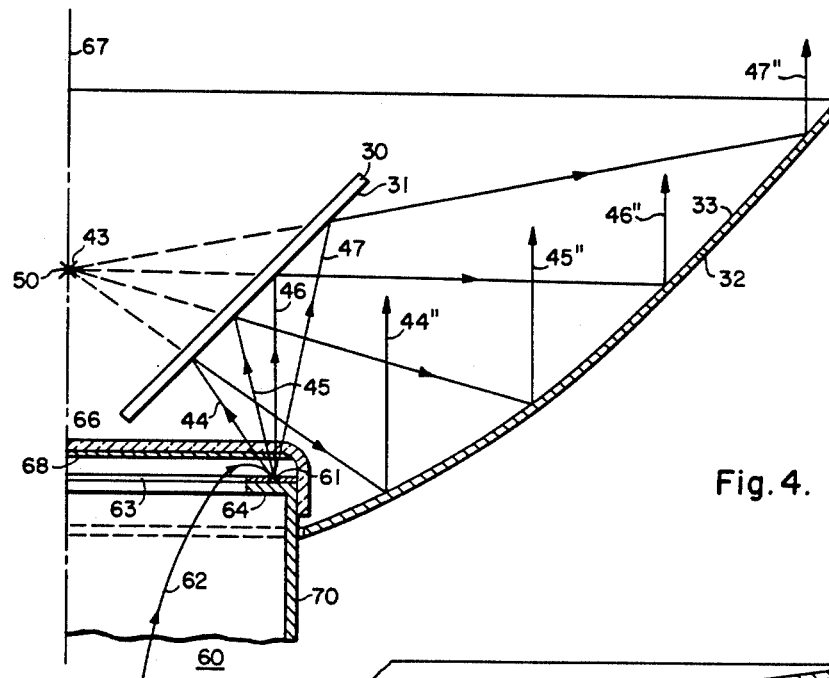
FIG. 4 is an illustrative diagram of a third embodiment of the present invention.
Figure 5:
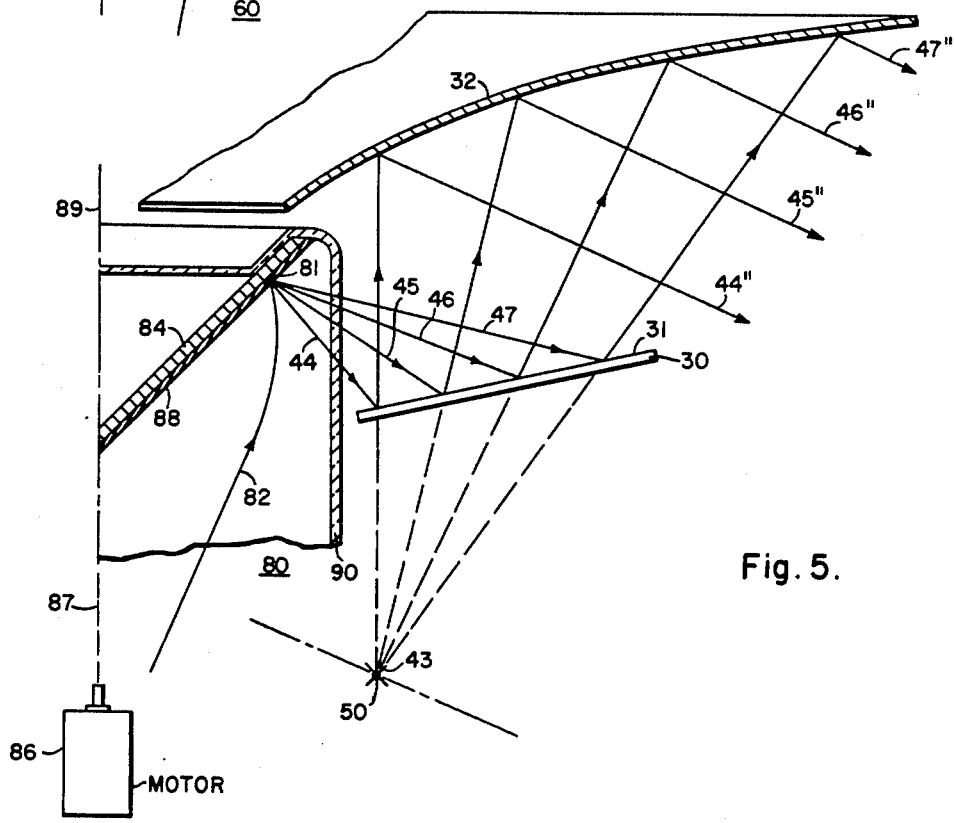
FIG. 5 is an illustrative diagram of a fourth embodiment of the present invention.

By means of utilizing a reflected beam cathode ray tube another embodiment of the present invention is shown in FIG. 4. In this embodiment, the heat conductivity is optimized by replacing the substrate used in the fluorescent screen of the ordinary type cathode ray tubes by a metal substrate 64. The phosphor 63 is deposited on the metal substrate and a reflected electron beam 62 having a higher power density than is normally possible is used to bombard the fluorescent creating a much brighter light source while at the same time providing better heat conduction from the light source.

The metal substrate 64 as shown in FIG. 4 consists of a flange or rim joined with the metal side wall 70 of the cathode ray tube 60. The phosphor 63 is deposited on the upper side of the flange forming the substrate 64 and a cup shaped glass face 66 is sealed to the tube. A transparent electrically conductive coating 68 is deposited on the face plate and is held at ground potential. The retarding field from the transparent coating 68 to the phosphor 63 and the substrate 64 will bend the electron beam 62 as shown. The electrons are repelled by the transparent coating 68 which carries no current and suffers no voltage drop. Although the electron gun is located behind the substrate the radiation is directed forward as in an ordinary cathode ray tube shown in the preferred embodiment of FIG. 1 where the phosphor is deposited on the glass face 27. For a more comprehensive discussion of the reflected electron beam, reference is made to the proceedings of the I.R.E. August 1960, pages 1409-1417. In combination with the reflected beam cathode ray tube 60 of FIG. 4 are the optical beam forming means comprising the rotatable plane mirror 30 and the paraboloid mirror 32 as utilized in the preferred embodiment of FIG. 1. Operating substantially as shown in FIG. 1, light energy in the form of rays 44, 45, 46 and 47 emanate from the spot of light 61 and form a virtual image of the spot 61 behind the mirror 30 at 50 along the center line of the tube 67. The focal point 43 of the paraboloid mirror 32 is likewise made to coincide with the virtual image 50 thereby providing for outward transmission of beams 44″-47″. These beams have the appearance of being radiated from the virtual image 50 instead of the spot 61. Also, the plane mirror 30 is provided with means as illustrated in FIG. 1 but not shown here, for rotating in synchronism with the deflection of the spot 61 around the outside of the cathode ray tube 60 in the confines of the metal substrate 64.

The fourth embodiment of the present invention as illustrated in FIG. 5 generates a beam of non-coherent light which appears to emanate from a virtual image by means of a cathode ray tube 80. This embodiment improves the heat conductivity of the spot produced by the electron beam bombarding the phosphor by replacing the cathode ray tube as illustrated in FIG. 1 by a tube which replaces the glass face plate by one of metal and using the principle of backward radiation to collect the light generated and beam it to an external point. A metal substrate 84 similar to that utilized in the embodiment shown in FIG. 4 is required. The substrate 84 as illustrated in FIG. 5, however, is shaped in the form of a cone and the phosphor 88 is deposited thereon. The light is reflected back through the glass side wall 90 of the cathode ray tube 80 to the plane mirror 30. The rays of light 44 through 47 emanate from the spot 81 and are reflected from the surface 31 of the plane mirror 30, forming a virtual image 50 behind plane mirror 30. The rays thus reflected from the plane surface 31 are in turn reflected by the paraboloid mirror 32 which is located in front of the cathode ray tube 80 in an arrangement converse to the arrangements shown in FIGS. 1 through 5. The paraboloid mirror 32 is located with respect to the plane mirror 30 such that the focal point 43 of the paraboloid 32 falls or lies coincident with the virtual image 50. In this manner, the light beams 44″ through 47″ are reflected from the paraboloid mirror to an external point having the appearance of being emitted not from the spot 81 formed on the phosphor deposited on the cone metal substrate 84 but on the other hand appear to be emanating from the virtual image 50. In the embodiment shown in FIG. 5, the relative movement between the spot 81 and the fluorescent screen comprising the metal substrate 84 and the phosphor 88 is provided by spinning the tube around its axis 89. This rotation is provided by a means illustrated as a motor 86 having a mechanical connection 87 to the cathode ray tube 80. If a spiral trace is swept on the phosphor 88 then the virtual image of the excited spot moves along the line L—L as illustrated in FIG. 5. The paraboloid may then be kept in focus by a corresponding axial movement with respect to the axis 89 by a servo loop, for example 17 of FIG. 1, but not shown, activated by the current in the deflection yoke, not shown, but substantially as 24 of FIG. 1.

In summation, therefore, means have been described whereby non-coherent radiation, in the optical region of the electromagnetic spectrum may be concentrated in a narrow directed beam. The radiation may be intensity modulated at any frequency up to several megacycles per second. Four embodiments of the invention are described. Two make use of a mirror spinning at a moderate rate. Another is entirely stationary without any moving parts and may be used when the utmost beam concentration is not necessary. In the last embodiment the cathode ray tube is rotated. All solutions, however, are based on the use of a stationary virtual image acting as an apparent radiator. The virtual image rather than the real point source is arrange to fall in the focal point of the beaming paraboloid or lens. By this expedient it is possible to take advantage of the unique ability of the phosphor to radiate efficiently at instantaneous power densities even higher than that existing on the surface of the sun. Correspondingly, long ranges of communication is thereby obtained. Also, still better heat conduction is provided for in the metal substrate shown in the embodiments of FIGS. 4 and 5 which permits the use of higher electron beam density and spot brightness.

Whereas apparatus has been shown and described with respect to preferred embodiments thereof which gives satisfactory results, it should be understood that changes may be made and equivalents substituted without departing from and spirit and scope of the invention.

I claim as my invention:

1. An optical beam generator comprising in combination: a means for generating an electron beam; target means operable with said electron beam to emit light energy in that region of the electromagnetic spectrum which includes the ultraviolet, the visual, and the infrared regions, when struck by said electron beam; means operable with said electron beam for focusing said electron beam on said target means to produce a source of light energy at a point of focus; means for producing an angular scan of said source of light an said target means; a beaming device located adjacent said target means being operable with said source of light energy to direct the energy emanating therefrom to an external point, said beaming device having a focal point, said beaming device moreover forming a virtual image of said source of light energy at said focal point causing the light energy leaving said beaming device to appear to emanate from said virtual image regardless of the relative movement between said source of light and said target means.

2. An optical beam generator comprising, in combination: a cathode ray tube having a fluorescent screen which emits energy in the light region of the electromagnetic spectrum including ultraviolet, visual, and infrared radiation, said cathode ray tube being operative to produce a source of light energy on said fluorescent screen in the form of a spot which approximates a point source; means operable with said cathode ray tube for providing a circular and a spiral scan of said source of light on said fluorescent screen in order to dissipate the heat produced at the location of said source on said screen; and means operable with said cathode ray tube for focusing said energy thus generated at said source of light energy into a relatively narrow beam, said means comprising an optical system having a focal point and including means for forming a substantially stationary virtual image of said spot at said focal point, said relatively narrow beam thus having the appearance at a distance of being generated by said stationary virtual image.

3. An optical beam generator comprising: a means for generating an electron beam; target means operable with said electron beam to emit energy in the light portion of the electromagnetic spectrum which includes the ultraviolet, the visual and the infrared regions, when bombarded by said electron beam; means operable with said electron beam for focusing said electron beam to a point on said target means to produce a high intensity source of light energy thereat; deflection means operable with said electron beam for providing angular movement of said source of light relative to said target means; optical means having a predetermined focal point, said optical means being located adjacent said target means to form a virtual image of said source of light energy and for directing said energy emitted from said source of light to an external station; and means operative with said optical means to change the position of said focal point to be coincident with said virtual image for causing said light energy to appear to be generated from said virtual image regardless of the movement of said source of light with respect to said target means.

4. An optical beam generator comprising in combination: a cathode ray tube having a fluorescent screen which emits light energy which includes the ultraviolet, the visual, and the infrared portions of the electromagnetic spectrum, said cathode ray tube having means to produce a spot of light on said fluorescent screen, including means to focus said spot to substantially a point source; means operable with said cathode ray tube for deflecting said spot in an angular trace on said fluorescent screen in order to dissipate heat produced at the position of said spot on said screen; reflective means operable with said cathode ray tube for focusing said light energy emanating at said point source into a substantially stationary light beam, said reflective means comprising an optical system having a focal point and including means for forming a substantially stationary virtual image of said point source; means operably connected to said reflective means for moving said focal point in accordance with the deflection of said spot for maintaining coincidence of said focal point with said virtual image, said light beam thus having the appearance of being generated at said stationary virtual image regardless of the deflection of said spot; and an input means operably connected to said cathode ray for modulating the intensity of said point source in accordance with an external input signal.

5. An optical beam generator comprising in combination: a cathode ray tube having a high intensity electron beam and a fluorescent screen which radiates light energy in the region of the electromagnetic spectrum which includes ultraviolet, visual and infrared radiation, said cathode ray tube being operative to produce substantially a point source of light by impinging said electron beam on said fluorescent screen; deflection means operable with said cathode ray tube for providing motion of said point source in both a circular and a spiral path on said fluorescent screen in order to dissipate the heat produced in the vicinity of said point source on said fluorescent screen; and means operable with said cathode ray tube for externally directing said light energy thus radiated from said point source into a relatively narrow beam, said means comprising an optical system having a focal point and including means for forming a substantially stationary virtual image of said point source at said focal point, including means for moving said optical system relative to said cathode ray tube for maintaining the location of said focal point at the position of the virtual image thereby using a stationary virtual image of a moving point source to act as an apparent radiator.

6. An optical beam generator comprising in combination: a cathode ray tube having a fluorescent screen which emits light energy in the region of the electromagnetic spectrum which includes ultraviolet, visual and infrared radiation, said cathode ray tube being operative to produce a spot of light on said fluorescent screen, said spot of light being substantially a point source of radiation; means operable with said cathode ray tube for deflecting said spot of light in an angular pattern on said fluorescent screen, said angular pattern being variable in accordance with a control signal applied to said means for providing deflection; and optical means operable with said cathode ray tube for focusing said light energy emanating from said spot of light into a beam of relatively narrow beam width, said optical means comprising a first reflector means and a second reflector means, said first reflector means being rotatively mounted in front of said spot of light on cathode ray tubes, means operable with first reflector means for providing rotation about an axis of rotation which is normal to the center of said fluorescent screen, said first reflector means being disposed at an acute angle with respect to said fluorescent screen such that the light energy from said spot when reflected therefrom forms a virtual image of said spot of light along said axis of rotation, said second reflector means being in the form of a truncated paraboloid, said truncated paraboloid being disposed around said fluorescent screen for radiating the light energy reflected from said first reflector means to an external point, said second reflector means having a focal point located coincident with said virtual image formed by said first reflector means thereby providing a substantially stationary beam from said spot of light moving in an angular pattern around said fluorescent screen; and means operably connected to said first reflector means for rotating said first reflector means in synchronism with said spot of light.

7. An optical beam generator comprising in combination a cathode ray tube having a fluorescent screen bombarded by an electron beam, said screen emitting light energy in the region of the electromagnetic spectrum which includes ultraviolet, visual and infrared radiation, said cathode ray tube being operative to produce a point source of light on said fluorescent screen; deflection means operable with said cathode ray tube for generating a circular trace on said fluorescent screen by deflection of said point source in order to dissipate the heat produced at the point of bombardment of said screen by said electron beam; means operable with said cathode ray tube for directing the light energy radiated from said point source into a relatively narrow beam for transmission to an external point, said means comprising a first and second optical means, said first optical means having a flat surface tilted at a predetermined acute angle with respect to said fluorescent screen and being rotatably positioned in front of said fluorescent screen, said first optical means further being rotated in synchronism with said deflection means to reflect light radiated from said point source, said rotation being about an axis of rotation located at the center of the fluorescent screen and normal thereto; means operably connected to said first optical means for providing synchronous rotation with said point source; said second optical means having the shape of a truncated paraboloid being disposed about said fluorescent screen of said cathode ray tube and having a focal point which lies along said rotatable axis of said first reflector means, said light energy emanating from said spot of light being first reflected from said first reflector means and then by said second reflector, said first reflector simultaneously forming a virtual image of said spot along the axis of rotation; means operably connected to said second optical means for providing continuous coincidence of position between said focal point and said virtual image thus providing a substantially stationary beam from said point source of light which is moving in a circular trace.

8. An optical beam generator comprising in combination: a cathode ray tube having a fluorescent screen which emits light energy in the region of the electromagnetic spectrum which includes ultraviolet, visual, and infrared radiation, said cathode ray tube being operative to produce a source of light on said screen in the form of a sharply focused spot; means operable with said cathode ray tube for providing angular scanning of said source on said fluorescent screen for dissipating heat produced thereat; optical means comprising a plurality of mirrors disposed in front of said fluorescent screen and being operably related to each other to form a substantially stationary virtual image of said source of light during angular rotation of said source and to direct said light energy emanating from said source to an external location but presenting the appearance of directing said light energy from said stationary virtual image rather than said source.

9. An optical beam generator comprising, in combination, a cathode ray tube having a fluorescent screen which emits light energy in the region of the electromagnetic spectrum including ultraviolet, visual, and infrared radiation, said cathode ray tube including means to produce a spot of light on said fluorescent screen, said spot having a finite size but substantially providing a point source; means operable with said cathode ray tube for providing angular motion of said spot on said fluorescent screen describing a circular trace of a predetermined diameter, said diameter having a center located substantially at the mid point of said fluorescent screen; means operable with said cathode ray tube for focusing said light energy emitted from said spot into a light beam having relatively narrow beamwidth, said means comprising a first and a second mirror surface located in the vicinity of said fluorescent screen, said first mirrored surface being conical in shape having an apex located at said center of said fluorescent screen for reflecting light energy from said spot and forming a virtual image of said spot behind said first mirror surface, said second mirror surface having the shape of a concave paraboloid located around said fluorescent screen such that said second mirror surface faces the said first mirror surface of said second mirror surface having a predetermined focal point located at said virtual image formed behind said first mirror surface.

10. An optical beam generator comprising in combination: a reflected beam cathode ray tube having an apertured fluorescent screen comprising a metal substrate and a phosphor coating applied thereto, said cathode ray tube being operative to generate a spot of light on said fluorescent screen, said spot of light emitting light energy in the electromagnetic spectrum which includes the ultraviolet, the visual and the infrared regions; means operable with said cathode ray tube for deflecting said spot to a predetermined point on said phosphor coating and for moving said spot in an angular path around said fluorescent screen; a first and a second optical means operable on said spot for directing said light energy emanating from said spot in a relatively narrow beam, said first optical means having a plane reflecting surface disposed angularly with respect to said fluorescent screen, the light energy being reflected toward said second optical means and forming a virtual image of said spot at a predetermined point behind said plane reflector surface, said second optical means having a paraboloid surface disposed around said cathode ray tube to receive light energy reflected from said first optical means, said second optical means also having a focal point coincident with said virtual image formed behind said plane reflecting surface causing the light energy emanating from said spot to appear to originate from said virtual image; and means connected to said first optical means for providing rotation about an axis normal to said fluorescent screen, said axis intersecting said focal point coincident with said virtual image.

11. An optical beam generator comprising in combination: a reflected beam cathode ray tube having an apertured fluorescent screen comprising a metal substrate and a phosphor coating applied thereto, said cathode ray tube being operative to generate a spot of light on said fluorescent screen, said spot of light emitting light energy in the electromagnetic spectrum which includes the ultraviolet, the visual and the infrared regions, means operable with said cathode ray tube for deflecting said spot to a predetermined point on said phosphor coating; means for rotating said cathode ray tube about its central axis; means operable with said cathode ray tube for deflecting said spot to a substantially stationary position in space whereby a stationary spot of light is generated on said phosphor coating which is moving relative to said spot due to the rotation of said cathode ray tube; a first and a second optical means operable in combination with said spot for directing said light emanating from said spot in a relatively narrow beam, said first optical means having a plane reflecting surface disposed angularly with respect to said fluorescent screen, the light energy being reflected towards said second optical means and forming a virtual image of said spot at a predetermined point behind said plane reflecting surface, said second optical means having a paraboloid surface disposed in front of said cathode ray tube and said first optical means to receive light energy reflected from said first optical means, said second optical means also having a focal point coincident with said virtual image formed behind said plane reflecting surface causing the light energy emanating from said spot to appear to emanate from said virtual image.

References Cited by the Examiner

UNITED STATES PATENTS 2,165,078  7/39  Toulon _____ 178—7.85

DAVID G. REDINBAUGH, *Primary Examiner.*

ROY LAKE, *Examiner.*